United States Patent
Chiu

(10) Patent No.: US 8,692,971 B2
(45) Date of Patent: Apr. 8, 2014

(54) 2D AND 3D SWITCHABLE DISPLAY DEVICE AND LIQUID CRYSTAL LENS THEREOF

(75) Inventor: Chung-Hsiang Chiu, Hsin-Chu (TW)

(73) Assignee: AU Optronics Corp., Science-Based Industrial Park, Hsin-Chu (TW)

(*) Notice: Subject to any disclaimer, the term of this patent is extended or adjusted under 35 U.S.C. 154(b) by 545 days.

(21) Appl. No.: 12/730,208

(22) Filed: Mar. 23, 2010

(65) Prior Publication Data
US 2011/0102689 A1    May 5, 2011

(30) Foreign Application Priority Data
Oct. 30, 2009  (TW) ................................ 98136999 A

(51) Int. Cl.
G02F 1/13  (2006.01)
(52) U.S. Cl.
USPC ............................................ 349/200; 349/15
(58) Field of Classification Search
USPC .......................................... 349/200–202, 15
See application file for complete search history.

(56) References Cited

U.S. PATENT DOCUMENTS

| | | | |
|---|---|---|---|
| 4,385,805 A | 5/1983 | Channin | |
| 7,245,430 B2 | 7/2007 | Kobayashi | |
| 8,284,335 B2 * | 10/2012 | Kim et al. | 349/15 |
| 2003/0112397 A1 | 6/2003 | Lee | |
| 2004/0046914 A1 | 3/2004 | Hirota | |
| 2007/0070266 A1 * | 3/2007 | Ochiai et al. | 349/106 |
| 2007/0296911 A1 * | 12/2007 | Hong | 349/200 |
| 2008/0316378 A1 * | 12/2008 | Huang et al. | 349/15 |
| 2009/0015737 A1 * | 1/2009 | Jung et al. | 349/15 |
| 2009/0122210 A1 | 5/2009 | Im | |
| 2009/0147186 A1 * | 6/2009 | Nakai et al. | 349/74 |
| 2009/0153754 A1 | 6/2009 | Jung | |
| 2009/0185125 A1 * | 7/2009 | Hida et al. | 349/141 |
| 2010/0165280 A1 * | 7/2010 | Ishitani et al. | 349/141 |

FOREIGN PATENT DOCUMENTS

| | | |
|---|---|---|
| CN | 101419352 A | 4/2009 |
| CN | 101533169 A | 9/2009 |
| TW | 200931127 | 7/2009 |

\* cited by examiner

*Primary Examiner* — Richard Kim
(74) *Attorney, Agent, or Firm* — Winston Hsu; Scott Margo

(57) ABSTRACT

A 2D and 3D switchable display device includes a display panel, and a liquid crystal lens disposed on the display panel. The liquid crystal lens includes a first substrate, a second substrate, a first electrode, a second electrode, an insulating layer, a liquid crystal layer, and a third electrode. The first electrode, disposed on one side of the first substrate facing the second substrate, has a slit. The second electrode is disposed between the first substrate and the second substrate, and substantially corresponding to the slit of the first substrate.

11 Claims, 5 Drawing Sheets

2D AND 3D SWITCHABLE DISPLAY DEVICE AND LIQUID CRYSTAL LENS THEREOF

BACKGROUND OF THE INVENTION

1. Field of the Invention

The present invention relates to a 2D and 3D switchable display device and a liquid crystal lens thereof, and more particularly, to a 2D and 3D switchable display device and a liquid crystal lens thereof utilizing an electrode pattern design to achieve low capacitive loading.

2. Description of the Prior Art

The principle of three-dimensional (3D) stereoscopic display technique is to provide an observer separate images to his left eye and right eye respectively. The brain of the observer will then analyze and overlap the images perceived by his two eyes to generate gradation and depth in images, and furthermore, a sense of stereoscopic vision.

Currently, the stereoscopic display devices can mainly be categorized into two groups: time-sequential and spatial multiplexing. A time-sequential stereoscopic display device alternately provides the left eye of the observer with a left-eye image and the right eye of the observer with a right-eye image in sequence by scanning. The observer has to wear shutter glasses while watching the images. According to the display image at present, shutter glasses only allow a left-eye image sent to the left eye of the observer, but not the right eye of the observer, and vice versa in order to provide a 3D display. A spatial multiplexing stereoscopic display device primarily includes a parallax barrier stereoscopic display device. A parallax barrier stereoscopic display device can block the left eye and the right eye of the observer by disposing a parallax barrier in front of the display panel. Due to different observing angels, the left-eye images and the right-eye images can only be perceived by the left eye and the right eye of the observer respectively.

However, there are a lot of disadvantages in applications or effects of the conventional stereoscopic display device. First, the necessity of wearing shutter glasses while using the time-sequential stereoscopic display device causes inconvenience. Second, in the transitional process between the left-eye image and the right-eye image, part of the display images including both left-eye image and right-eye image have to be discarded in order to avoid perceptive confusion of the observer no matter the images are received by the left or the right eye. Therefore, brightness and frame rate will be decreased in the time-sequential stereoscopic display device and its display quality will be adversely affected. Moreover, a parallax barrier stereoscopic display device has a drawback of low brightness since part of the light will be blocked.

In light of the shortcomings, a liquid crystal lens type 3D display device has been developed. Referring to FIG. 1, FIG. 1 is a schematic diagram illustrating a conventional liquid crystal lens type 3D display device. As shown in FIG. 1, the conventional liquid crystal lens type 3D display device 10 includes a display panel 20 and a liquid crystal lens 30 disposed on the display panel 20. The liquid crystal lens 30 includes a first substrate 32, a second substrate 34, a plurality of first electrodes 36, a plurality of second electrodes 38, an insulating layer 40, a liquid crystal layer 42, and a third electrode 44. The first substrate 32 and the second substrate 34 are disposed opposite to each other. The first electrodes 36 are disposed on a side of the first substrate 32 facing the second substrate 34. The second electrodes 38 are disposed between the first substrate 32 and the second substrate 34. Each of the second electrodes 38 is corresponding to each of the first electrodes 36 and each of the second electrodes 38 is fully overlapped with each of the first electrodes 36, wherein each of the second electrodes 38 does not include any opening, gap, slot, hole, or slit. The insulating layer 40 is disposed between the first electrodes 36 and the second electrodes 38. The liquid crystal layer 42 is disposed between the second electrodes 38 and the second substrate 34. The third electrode 44 is disposed between the liquid crystal layer 42 and the second substrate 34. In a 3D display mode, the first electrodes 36 have a first voltage, the second electrodes 38 have a second voltage, and the third electrode 44 has a common voltage so that a lens effect will be generated when the liquid crystal layer 42 is driven by an electrical field. However, each of the second electrodes 38 is fully overlapped with each of the first electrodes 36, which causes capacitive loading between them. Thus, the liquid crystal lens 30 needs a higher voltage to be driven due to the capacitive loading, thus increasing the power consumption and driver chip cost. In addition, the lens effect will be adversely affected by the capacitive loading.

SUMMARY OF THE INVENTION

It is therefore one of the objectives of the present invention to provide a 2D and 3D switchable display device and the liquid crystal lens thereof to solve the conventional technical problems.

According to a preferred embodiment of the present invention, a liquid crystal lens is provided. The liquid crystal lens includes a first substrate, a second substrate, a first electrode, a second electrode, an insulating layer, a liquid crystal layer, and a third electrode. The second substrate is disposed opposite to the first substrate and a space is disposed between the first substrate and the second substrate. The first electrode, disposed on a side of the first substrate facing the second substrate, has a slit. The second electrode is disposed between the first substrate and the second substrate, and the second electrode is substantially corresponding to the slit of the first electrode. The insulating layer is disposed between the first electrode and the second electrode. The liquid crystal layer is disposed between the second electrode and the second substrate. The third electrode is disposed between the liquid crystal layer and the second substrate.

According to another preferred embodiment of the present invention, a 2D/3D switchable display device is provided. The 2D/3D switchable display device includes a display panel and the above-mentioned liquid crystal lens disposed thereon.

The liquid crystal lens of the present invention provides a first electrode designed with a slit and the position of a second electrode is substantially corresponding to the slit of the first electrode. As a result, the area that the first electrode and the second electrode overlap with each other in a vertical projection direction will not be too large so that capacitive loading generated by th overlapping between the first electrode and the second electrode is diminished. Accordingly, the liquid crystal lens of the present invention can be driven by a lower driving voltage, thus reducing its power consumption and driver chip cost. Additionally, by the design of an electrode with a slit, the present invention can provide a liquid crystal lens with a better lens effect.

These and other objectives of the present invention will no doubt become obvious to those of ordinary skill in the art after reading the following detailed description of the preferred embodiment that is illustrated in the various figures and drawings.

DETAILED DESCRIPTION

In order to enable those skilled in the art to comprehend the present invention, some preferred embodiments of the present invention are exemplified along with drawings to elaborate the content body of the present invention and its desired technical effect.

Figure 1:
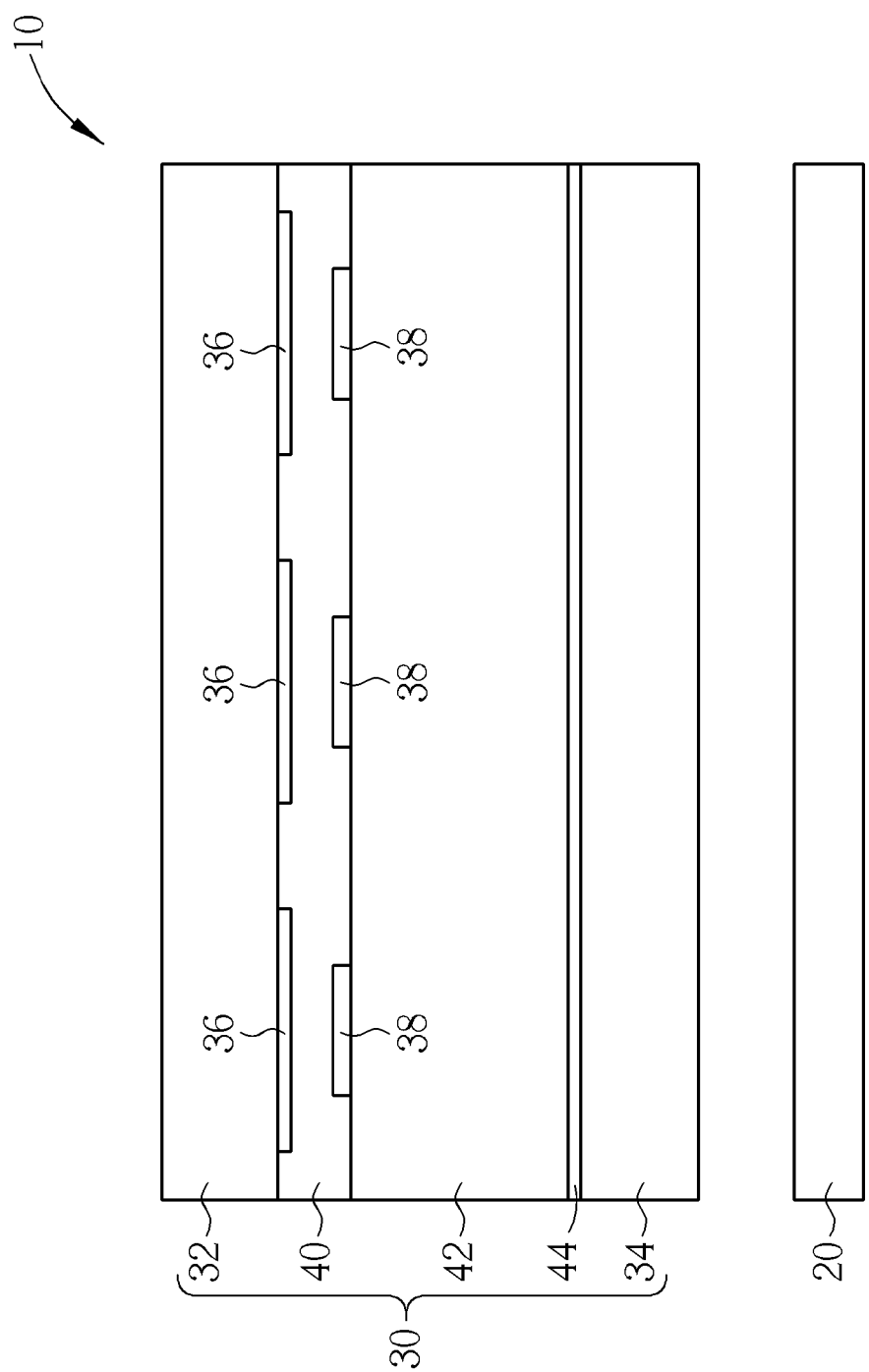
FIG. 1 is a schematic diagram showing a conventional liquid crystal lens type 3D display device.
Figure 2:
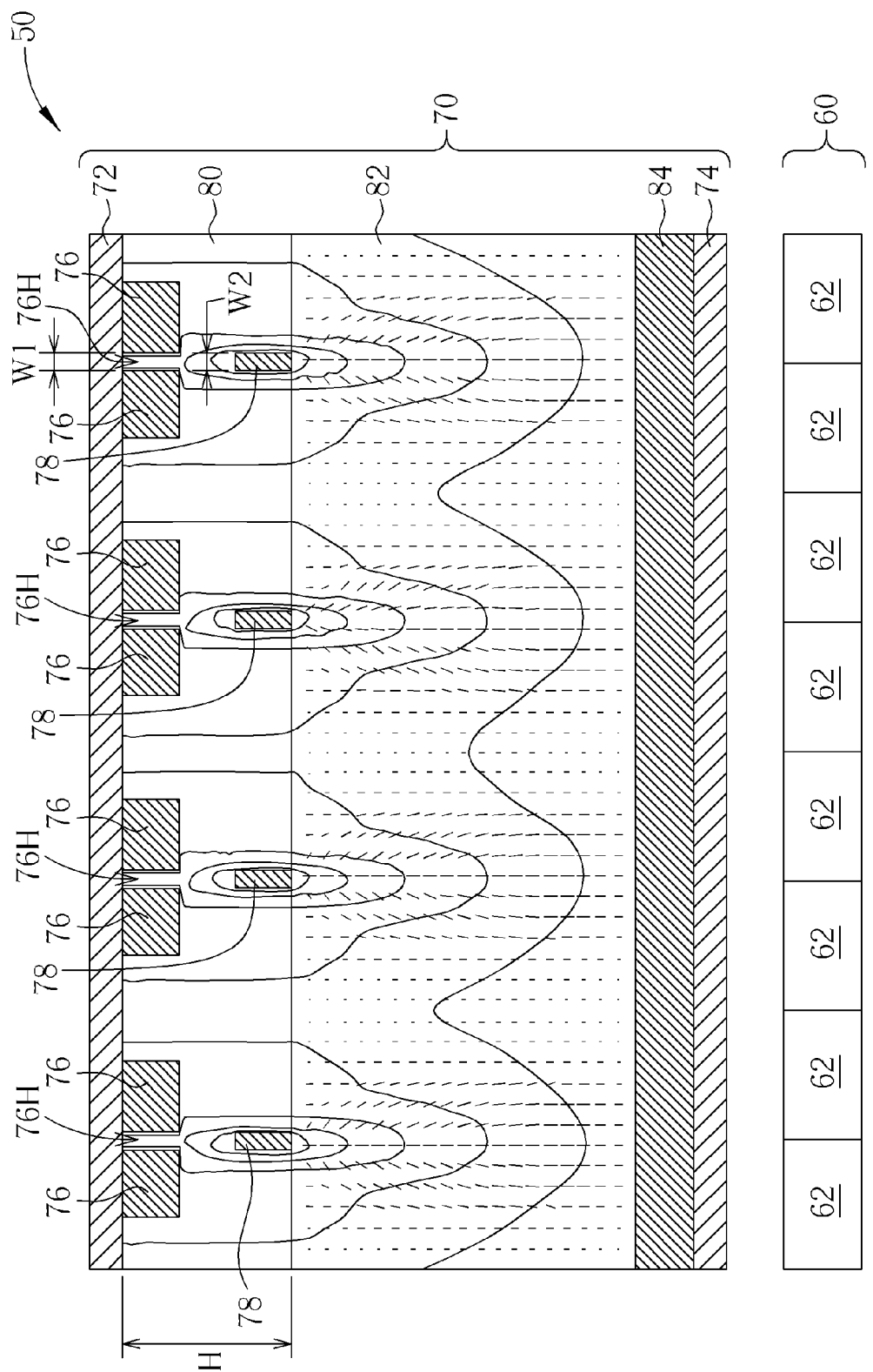
FIG. 2 is a schematic diagram showing a 2D and 3D switchable display device according to a preferred embodiment of the present invention.

FIG. 2 is a schematic diagram showing a 2D and 3D switchable display device according to a preferred embodiment of the present invention. As shown in FIG. 2, the 2D and 3D switchable display device 50 includes a display panel 60, and a liquid crystal lens 70 disposed on the display panel 60. In generally, the display panel 60 comprise a base (not shown) within a controlled matrix layer and a display medium layer (not shown) disposed on the base within controlled matrix layer, wherein the controller matrix layer includes a plurality of sub-pixel regions 62, each of sub-pixel regions 62 has at least one switch (not shown), and the display medium layer can be liquid crystal material, organic light emitting material, inorganic light emitting material, electrophoretic material, electro-wetting material, other suitable materials, or a combinations thereof. So, the display panel 60 according to the above-mentioned of the material of the display medium layer can be a liquid display panel, an organic electroluminescent display panel, a plasma display panel, an electrophoretic display panel, a field emission display panel, or other types of display panels. Preferably, the display panel 60 optionally comprises another base (not shown) disposed on the display medium layer (not shown) to protect the display medium layer (not shown), wherein at least one of the base and another base can be transparent materials, reflective materials, semi-transparent materials, or other suitable materials. The liquid crystal lens 70 includes a first substrate 72, a second substrate 74, a plurality of first electrodes 76, a plurality of second electrodes 78, an insulating layer 80, a liquid crystal layer 82, and a third electrode 84. The first substrate 72 and the second substrate 74 are disposed opposite to each other. The second substrate 74 is disposed on a side that is close to (i.e. nearest to) the display panel 60. There is a space between the first substrate 72 and the second substrate 74. The first electrodes 76 are disposed on a side of the first substrate 72 facing the second substrate 74 and each of the first electrodes 76 has a slit 76H. The second electrodes 78 are disposed between the first substrate 72 and the second substrate 74. Each of the second electrodes 78 is substantially corresponding to the slit 76H of each of the corresponding first electrodes 76 so that each of the first electrodes 76 and each of the second electrodes 78 do not overlap with each other in a vertical projection direction substantially. The insulating layer 80 is disposed between the first electrodes 76 and the second electrodes 78. A thickness of the insulating layer 80 is substantially a vertical distance H between the first electrodes 76 and the second electrodes 78. In the present embodiment, the thickness of the insulating layer 80 is, but not limited to being, substantially between 200 Å (angstroms) and 8 μm (micrometers), and preferably between 3 μm and 5 μm. The liquid crystal layer 82 is disposed between the second electrodes 78 and the second substrate 74. A thickness of the liquid crystal layer 82 is substantially between 10 μm and 200 μm, and preferably between 15 μm and 45 μm, but not limited, in order to achieve a lens effect. Moreover, when a liquid display panel is selected for the display panel 60, another liquid crystal layer (not shown in the drawing) will be disposed inside the display panel 60, and a thickness of the liquid crystal layer of the liquid display panel is substantially between 3 μm and 5 μm. Accordingly, the thickness of the liquid crystal layer 82 of the liquid crystal lens 70 is greater than that of the liquid crystal layer of the liquid display panel. The third electrode 84 is disposed between the liquid crystal layer 82 and the second substrate 74.

In the present embodiment, the first electrodes 76 are disposed on a surface of the first substrate 72 facing the second substrate 74, and the third electrode 84 is disposed on a surface of the second substrate 74 facing the first substrate 72, but not limited. For example, other layers may be formed between the first electrodes 76 and the first substrate 72, or between the third electrode 84 and the second substrate 74. In addition, the slit 76H of each of the first electrodes 76 has a first width W1, and each of the second electrodes 78 has a second width W2. In the present embodiment, the first width W1 of the slit 76H of each of the first electrodes 76 is, but not limited to being, substantially equal to the second width W2 of each of the second electrodes 78. A ratio of the first width W1 to the second width W2 can be, but not limited to being, between 1% and 500%, and preferably between 100% and 200%. Furthermore, a width of each of the first electrodes 76 can be 90 μm. The first width W1 of the slit 76H and the second width W2 of each of the second electrodes 78 can respectively be, but not limited to being, in a range of 10 μm to 14 μm, and preferably 12 μm. In the present embodiment, each of the second electrodes 78 is substantially corresponding to the slit 76H of each of the first electrodes 76. Each of the first electrodes 76 and each of the second electrodes 78 substantially do not overlap with each other in a vertical projection direction. However, while considering the misalignment bias in the manufacturing processes of the first electrodes 76 and the second electrodes, the first width W1 of the slit 76H of each of the first electrodes 76 and the second width W2 of each of the second electrodes 78 can be adjusted accordingly. For example, the second width W2 can be modified to be smaller than the first width W1 to prevent the first electrodes 76 and the second electrodes 78 from overlapping with each other in a vertical projection direction. Additionally, the distance between the second electrodes 78 and the first electrodes 76 in a horizontal direction or a vertical direction can be modified to be larger in order to reduce capacitive loading. More specifically, when the first width W1 of the first electrodes 76 is greater than the second width W2 of the second electrodes 78 in a more significant way, or when the vertical distance H between the first electrodes 76 and the second electrodes 78 is larger, it will achieve a better effect of reducing capacitive loading.

The 2D and 3D switchable display device 50 can respectively provide 2D display mode or 3D display mode while driven by the electrical field. For instance, in the 2D display mode, when there is no voltage applied to the first electrodes 76, the second electrodes 78, and the third electrode 84, the liquid crystal lens 30 will not be working. Therefore, the display image offered by the display panel 60 can directly pass through the liquid crystal lens 70 and offer an observer a 2D display image. In the 3D display mode, proper voltages can be applied to the first electrodes 76, the second electrodes 78, and the third electrode 84. For example, the first electrodes 76 can be applied with a low voltage, the second electrodes 78 can be applied with a high voltage, and the third electrode 84 can be applied with a common voltage. Thus, while driven by the electrical field, the liquid crystal lens 30 will exhibit a lens effect to refract the images generated by the display panel 60, which are being sent to the left eyes and the right eyes of the observer respectively. As a result, the observer can perceive a 3D display image.

Figure 3:
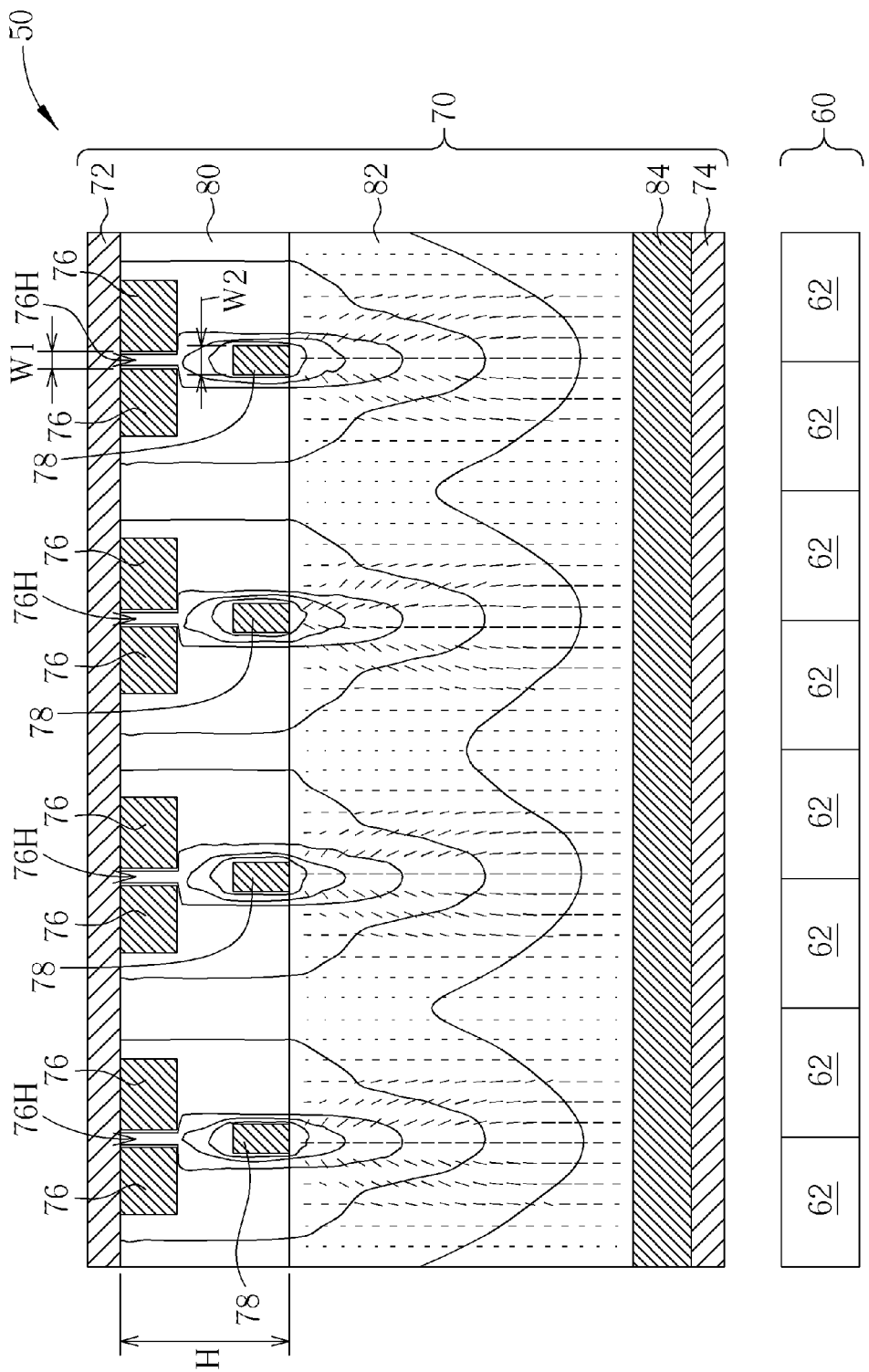
FIG. 3 is a schematic diagram showing a 2D and 3D switchable display device according to another preferred embodiment of the present invention.

FIG. 3 is a schematic diagram showing a 2D and 3D switchable display device according to another preferred embodiment of the present invention. To emphasize the dissimilarities among different embodiments, identical components are denoted by identical numerals and will not be redundantly described. As shown in FIG. 3, each of the second electrodes 78 is substantially corresponding to the slit 76H of each of the first electrodes 76 in the present embodiment. However, the first electrodes 76 and the second electrodes 78 are partially overlapping with each other in a vertical projection direction due to that the second width W2 of each of the second electrodes 78 is slightly larger than the first width W1 of the slit 76H of each of the first electrodes 76; or due to that the first electrodes 76 and the second electrodes 78 are inevitably misaligned in the manufacturing process. Although that the first electrodes 76 and the second electrodes 78 are overlapping with each other in a vertical projection direction, which may cause little capacitive loading, it is still significantly lower than that of the conventional 3D display device without a slit design of the first electrode.

Figure 4:
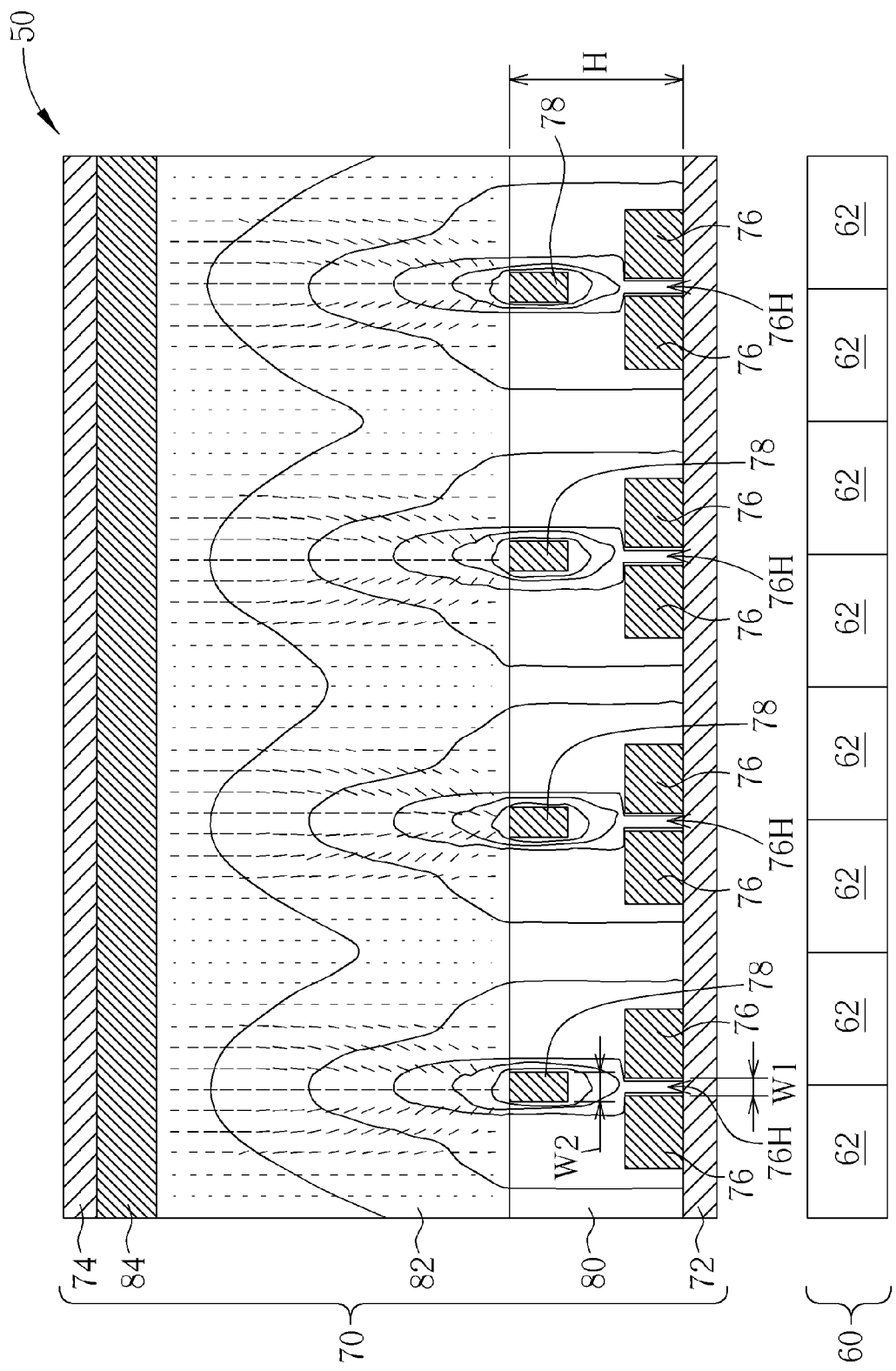
FIG. 4 is a schematic diagram showing a 2D and 3D switchable display device according to yet another preferred embodiment of the present invention.

FIG. 4 is a schematic diagram showing a 2D and 3D switchable display device according to yet another preferred embodiment of the present invention. To emphasize the dissimilarities among different embodiments, identical components are denoted by identical numerals and will not be redundantly described. As shown in FIG. 4, the first substrate 72 of the liquid crystal lens 50 is disposed on a side close to (i.e. nearest to) the display panel 60 in the present embodiment and the second substrate 74 is disposed on a side far from the display panel 60. In other words, the difference between the liquid crystal lens 50 of the present embodiment and those of the previous embodiments lies in that the liquid crystal lens 50 is rotated by 180 degrees. In addition, the thicknesses, widths, and slits of the first electrodes 76, the second electrodes 78, and the third electrode 84 or the thickness of the liquid crystal layer 82 can be designed according to any aspect disclosed in the aforesaid embodiments.

Figure 5:
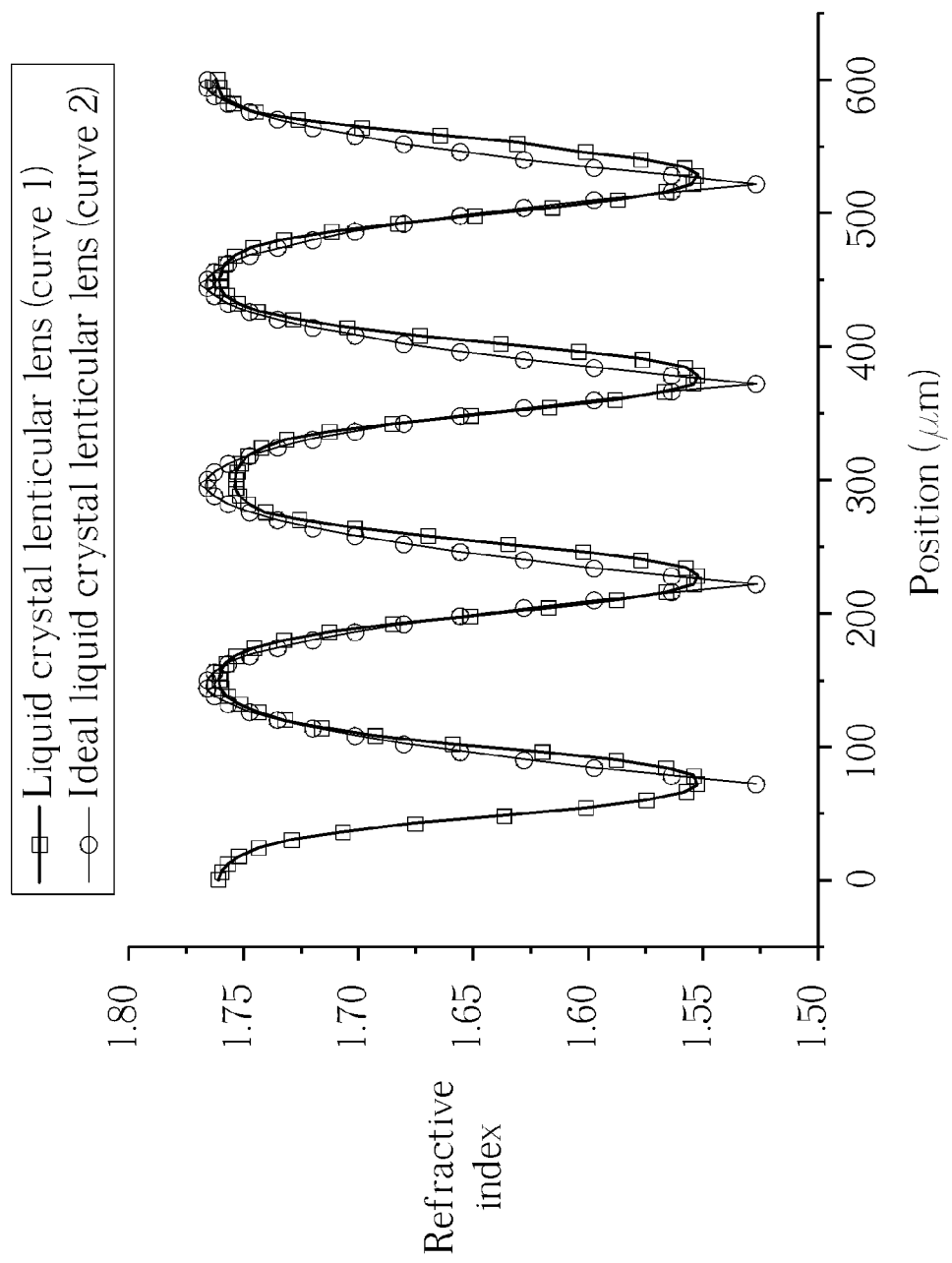
FIG. 5 illustrates the correlation between positions and refractive indexes of the liquid crystal lens according to the present invention.

FIG. 5 illustrates the correlation between positions and refractive indexes of the liquid crystal lens according to the present invention. Curve 1 represents the correlation between positions and refractive indexes of the liquid crystal lens of the present invention, and curve 2 represents the correlation between the positions and refractive indexes of an ideal lens. As shown in FIG. 5, the lens effect provided by the liquid crystal lens of the present invention is close to that provided by the ideal lens; therefore a 3D display effect can be achieved.

In summary, the liquid crystal lens of the present invention provides a first electrode designed with a slit and the position of a second electrode is substantially corresponding to the slit of the first electrode. As a result, the area that the first electrode and the second electrode overlap with each other in a vertical projection direction will not be too large so that capacitive loading generated by the overlapping between the first electrode and the second electrode is diminished. Accordingly, the liquid crystal lens of the present invention can be driven by a lower driving voltage, thus reducing its power consumption and driver chip cost. Additionally, the present invention can provide a liquid crystal lens with a superior lens effect so that the light passing through the liquid crystal lens can be accurately refracted to offer a 3D display.

Those skilled in the art will readily observe that numerous modifications and alterations of the device and method may be made while retaining the teachings of the invention.

What is claimed is:

1. A liquid crystal lens, comprising:
a first substrate;
a second substrate disposed opposite to the first substrate, and a space being formed between the first substrate and the second substrate;
a plurality of first electrodes disposed on a side of the first substrate facing the second substrate, each of the first electrodes having a slit, wherein a gap exists between any two adjacent first electrodes, the gaps and the slits are arranged alternately;
a plurality of second electrodes disposed between the first substrate and the second substrate, each of the second electrodes being substantially corresponding to a slit of a respective one of the first electrodes, and the second electrodes being not corresponding to the gaps, wherein a distance between two adjacent first electrodes is smaller than a distance between two adjacent second electrodes;
an insulating layer disposed between the first electrodes and the second electrodes;
a liquid crystal layer disposed between the second electrodes and the second substrate; and
a third electrode disposed between the liquid crystal layer and the second substrate,
wherein the second electrodes are disposed between the first electrodes and the liquid crystal layer.

2. The liquid crystal lens of claim 1, wherein a slit of a first electrode of the plurality of first electrodes has a first width, and the corresponding second electrode has a second width.

3. The liquid crystal lens of claim 2, wherein a ratio of the first width of the slit of the first electrode to the second width of the second electrode is substantially between 1% and 500%.

4. The liquid crystal lens of claim 3, wherein the ratio of the first width of the slit of the first electrode to the second width of the second electrode is substantially 100%.

5. The liquid crystal lens of claim 1, wherein a first electrode of the plurality of first electrodes and the corresponding second electrode substantially do not overlap with each other in a vertical projection direction.

6. The liquid crystal lens of claim 1, wherein a first electrode of the plurality of first electrodes and the corresponding second electrode substantially overlap with each other in a vertical projection direction partially.

7. The liquid crystal lens of claim 1, wherein a thickness of the insulating layer is substantially between 200 angstroms (Å) and 8 micrometers (μm).

8. The liquid crystal lens of claim 1, wherein a thickness of the liquid crystal layer is substantially between 10 μm and 200 μm.

9. A 2D/3D switchable display device, comprising:
a display panel; and
a liquid crystal lens of claim 1, disposed on the display panel.

10. The 2D/3D switchable display device of claim 9, wherein the second substrate of the liquid crystal lens is nearest to the display panel.

11. The 2D/3D switchable display device of claim 9, wherein the first substrate of the liquid crystal lens is nearest to the display panel.

* * * * *